US011575900B2

(12) United States Patent
Chono

(10) Patent No.: US 11,575,900 B2
(45) Date of Patent: Feb. 7, 2023

(54) VIDEO CODING DEVICE, VIDEO DECODING DEVICE, VIDEO CODING METHOD, VIDEO DECODING METHOD AND PROGRAM

(71) Applicant: NEC Corporation, Tokyo (JP)

(72) Inventor: Keiichi Chono, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/316,431

(22) Filed: May 10, 2021

(65) Prior Publication Data

US 2021/0266553 A1 Aug. 26, 2021

Related U.S. Application Data

(63) Continuation of application No. 15/516,223, filed as application No. PCT/JP2015/004037 on Aug. 12, 2015, now Pat. No. 11,039,141.

(30) Foreign Application Priority Data

Oct. 3, 2014 (JP) ................................ 2014-204392

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/136* (2014.11); *H04N 19/176* (2014.11); *H04N 19/186* (2014.11); *H04N 19/70* (2014.11)

(58) Field of Classification Search
CPC .. H04N 19/126; H04N 19/136; H04N 19/176; H04N 19/186; H04N 19/70
See application file for complete search history.

(56) References Cited

U.S. PATENT DOCUMENTS

2005/0259730 A1  11/2005  Sun
2006/0018559 A1  1/2006  Kim et al.
(Continued)

FOREIGN PATENT DOCUMENTS

CN  102172024 A  8/2011
CN  102223525 A  10/2011
(Continued)

OTHER PUBLICATIONS

D. Flynn et al., High Efficiency Video Coding (HEVC) Range Extensions text specification: Draft 7, JCTVC-Q1005_v9, Joint Collaborative Team on Video Coding (JCT-VG) of ITU-T SG 16 WP 3 and ISO/IEC JTC 1/SC 29/WG 11, Apr. 2014.
(Continued)

*Primary Examiner* — Jae N Noh

(57) ABSTRACT

In a video coding device, a generation unit generates the prediction error signal from an input image, a transformation unit transforms the prediction error signal depending on a color space selected from among the plurality of color spaces, an adaptive chroma quantization offset derivation unit derives an adaptive chroma quantization offset, which is a parameter for adjusting a quantization parameter of a chroma component, for each of the plurality of color spaces, a quantization unit generates a quantization coefficient image based on the prediction error signal or the transformed prediction error signal by the transformation means, and an inverse quantization unit inverse-quantizes the quantization coefficient image by using the adaptive chroma quantization offset for the selected color space.

10 Claims, 17 Drawing Sheets

(51) Int. Cl.
*H04N 19/70* (2014.01)
*H04N 19/136* (2014.01)
*H04N 19/186* (2014.01)

(56) References Cited

U.S. PATENT DOCUMENTS

| | | | |
|---|---|---|---|
| 2006/0233251 A1 | 10/2006 | Kim et al. | |
| 2009/0168894 A1 | 7/2009 | Marpe et al. | |
| 2010/0239002 A1* | 9/2010 | Park | H04N 19/593 375/240.12 |
| 2012/0002721 A1 | 1/2012 | Berbecel et al. | |
| 2013/0142255 A1 | 6/2013 | Matsunobu et al. | |
| 2013/0188693 A1 | 7/2013 | Xu et al. | |
| 2013/0321675 A1 | 12/2013 | Cote et al. | |
| 2014/0003497 A1 | 1/2014 | Sullivan | |
| 2014/0003498 A1 | 1/2014 | Sullivan | |
| 2014/0314142 A1 | 10/2014 | Oh | |
| 2015/0256840 A1 | 9/2015 | Sato | |
| 2015/0264374 A1* | 9/2015 | Xiu | H04N 19/12 375/240.25 |

FOREIGN PATENT DOCUMENTS

| | | |
|---|---|---|
| CN | 102625100 A | 8/2012 |
| CN | 103501437 A | 1/2014 |
| JP | 2011-151683 | 8/2011 |
| RU | 2 316 909 C2 | 2/2008 |
| TW | 200629907 | 8/2006 |
| WO | WO 2015/143671 A1 | 10/2015 |
| WO | WO 2015/187978 A1 | 12/2015 |

OTHER PUBLICATIONS

L. Zhang et al., "SCCE5 Test 3.2.1: In-loop color-space transform", JCTVC-R0147(V2), Joint Collaborative Team on Video Coding (JCT-VG) of ITU-T SG 16 WP 3 and ISO/IEC JTC 1/SC 29/WG 11, pp. 1-8, Jun. 2014.

L. Zhang et al., "SCCE5 Test 3.2.1: In-loop color-space transform", Joint Collaborative Team on Video Coding (JCT-VG) of ITU-T SG 16 WP 3 and ISO/IEC JTC 1/SC 29/WG 11, [JCTVC-R0147], pp. 1-21, Jun. 2014.

W.S. Kim et al., "Residue Color Transform", Joint Video Team (JVT) of ISO/IEC MPEG & ITU-T VCEG, (ISO/IEC JTC1/SC29/WG11 and ITU-T SG16 Q.6), $12^{12}$ Meeting, Jul. 2004.

International Search Report and Written Opinion of ISA dated Sep. 29, 2015, in corresponding PCT International Application.

Invitation to Respond to Written Opinion, Written Opinion and Search Report, dated Dec. 1, 2017, issued from the Intellectual Property Office of Singapore, in counterpart Singapore Application No. 11201702743W.

Taiwanese Office Action dated Feb. 27, 2018, issued in counterpart Taiwanese Patent Application No. 104132320.

Rajan Joshi, "High Efficiency Video Coding (HEVC) Screen Content Coding: Draft 1 ", Joint Collaborative Team on Video Coding (JCT-VC) of ITU-T SG 16 WP 3 and 180/IEC JTC 1/SC 29/WG 11-R1005-v2, Sappiro, JP Jul. 9, 2014, pp. i-xiv and 1-44.

Keiichi Chono, "Enhanced Chroma QP Signaling for Adaptive Cross-Component Transform in SCC Extensions", Joint Collaborative Team on Video Coding (JCT-VC) of ITU-T SG 16 WP 3 and ISO/IEC JTC 1/SC 29/WG 11-S0040, Strasburg, FR, Oct. 17-24, 2014, pp. 1-7.

Krishna Rapaka et al., "QP Derivation for Adaptive Color Transform", Joint Collaborative Team on Video Coding (JCT-VC) of ITU-T SG 16 WP 3 and ISO/IEC JTC 1/SC 29/WG 11-S0144, Strasbourg, FR, Oct. 17-24, 2014, pp. 1-4.

Jonatan Samuelsson e! al., "QP Offset for Adaptive Color Transform", Joint Collaborative Team on Video Coding (JCT-VC) of ITU-T SG 16 WP 3 and ISO/IEC JTC 1/SC 29/\NG 11-S0092-v2, Strasbourg, FR, Oct. 17-24, pp. 1-3.

Krishna Rapaka et al., "QP Derivation and Offsets signaling for Adaptive Color Transform", Joint Collaborative Team on Video Coding (JCT-VC) of ITU-T SG16 WP 3 and 1S0/IEC JTC 1/SC 29,WG 11-S0300, Strasbourg, FR, Oct. 17-24, 2014, pp. 1-5.

Extended European Search Report dated Mar. 28, 2018, issued in counterpart European Patent Apphcation No. 15847019.5.

Office Action dated Apr. 10, 2018, from the Federal Service of Intellectual Property in counterpart Russian Patent Application No. 201710786/08(019009).

English translation of Office Action dated Apr. 10, 2018, from Federal Service of Intellectual Property in counterpart Russian Patent Application No. 201710786/08(019009}.

Notification of Reasons for Refusal dated Jul. 17, 2018, issued by the Japanese Patent Office in counterpart Japanese Patent Application No. 2016-551481.

Series H: Audiovisual NAD Multimedia Systems, Infrastructure of Audiovisual Services-Coding of Moving Video/High Efficiency video coding, Recommendation ITU-H. 265, ITU-T Telecommunication Standardization Sector of ITU, Apr. 13, 2013. pp. 69 and 79.

Notification of Reasons for Refusal, dated Oct. 9, 2018 and an English-language Translation, issued by the Japanese Patent Office in counterpart Japanese Patent Application No. 2016-51481.

Office Action dated Jul. 10, 2019, issued by The Chinese Patent Office in counterpart Chinese Patent Application No. CN 201580053910.9.

* cited by examiner

FIG. 5

| pps_range_extensions( ) { | Descriptor |
|---|---|
|   if( transform_skip_enabled_flag ) | |
|     log2_max_transform_skip_block_size_minus2 | ue(v) |
|   cross_component_prediction_enabled_flag | u(1) |
|   chroma_qp_offset_list_enabled_flag | u(1) |
|   if( chroma_qp_offset_list_enabled_flag ) { | |
|     diff_cu_chroma_qp_offset_depth | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|     } | |
|   } | |
|   log2_sao_offset_scale_luma | ue(v) |
|   log2_sao_offset_scale_chroma | ue(v) |
|   *if( adaptive_color_trans_flag ) {* | |
|     *alt_pps_cb_qp_offset* | se(v) |
|     *alt_pps_cr_qp_offset* | se(v) |
|   *}* | |
| } | |

*alt_pps_cb_qp_offset* and *alt_pps_cr_qp_offset* specify offsets to the luma quantization parameter Qp'Y used for deriving Qp'Cb and Qp'Cr, respectively. The values of alt_pps_cb_qp_offset and alt_pps_cr_qp_offset shall be in the range of −12 to +12, inclusive. When ChromaArrayType is equal to 0, alt_pps_cb_qp_offset and pps_cr_qp_offset are not used in the decoding process and decoders shall ignore their value.

FIG. 6

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         st_ref_pic_set(num_short_term_ref_pic_sets) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[i] | u(v) |
|           } else { | |

FIG. 7

| | |
|---|---|
| slice_qp_delta | se(v) |
| if( pps_slice_chroma_qp_offsets_present_flag ) { | |
|     slice_cb_qp_offset | se(v) |
|     slice_cr_qp_offset | se(v) |
|     if( adaptive_color_trans_flag ) { | |
|         alt_slice_cb_qp_offset | se(v |
|         alt_slice_cr_qp_offset | se(v |
|     } | |
| } | |

*alt_slice_cb_qp_offset* specifies a difference to be added to the value of alt_pps_cb_qp_offset when determining the value of the Qp'Cb quantization parameter. The value of alt_slice_cb_qp_offset shall be in the range of −12 to +12, inclusive. When alt_slice_cb_qp_offset is not present, it is inferred to be equal to 0. The value of alt_pps_cb_qp_offset + alt_slice_cb_qp_offset shall be in the range of −12 to +12, inclusive.

*alt_slice_cr_qp_offset* specifies a difference to be added to the value of alt_pps_cr_qp_offset when determining the value of the Qp'Cr quantization parameter. The value of alt_slice_cr_qp_offset shall be in the range of −12 to +12, inclusive. When alt_slice_cr_qp_offset is not present, it is inferred to be equal to 0. The value of alt_pps_cr_qp_offset + alt_slice_cr_qp_offset shall be in the range of −12 to +12, inclusive.

FIG. 8

| pps_range_extensions( ) { | Descriptor |
|---|---|
|   if( transform_skip_enabled_flag ) | |
|     log2_max_transform_skip_block_size_minus2 | ue(v) |
|   cross_component_prediction_enabled_flag | u(1) |
|   chroma_qp_offset_list_enabled_flag | u(1) |
|   if( chroma_qp_offset_list_enabled_flag ) { | |
|     diff_cu_chroma_qp_offset_depth | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|     } | |
|     *if( adaptive_color_trans_flag ) {* | |
|       *for( i = chroma_qp_offset_list_len_minus1+1; i <= 2\*chroma_qp_offset_list_len_minus1; i++ ) {* | |
|         *cb_qp_offset_list[ i ]* | *se(v)* |
|         *cr_qp_offset_list[ i ]* | *se(v)* |
|       *}* | |
|     *}* | |
|   } | |
|   log2_sao_offset_scale_luma | ue(v) |
|   log2_sao_offset_scale_chroma | ue(v) |
| } | |

FIG. 9

| pps_range_extensions( ) { | Descriptor |
|---|---|
|   if( transform_skip_enabled_flag ) | |
|     log2_max_transform_skip_block_size_minus2 | ue(v) |
|   cross_component_prediction_enabled_flag | u(1) |
|   chroma_qp_offset_list_enabled_flag | u(1) |
|   if( chroma_qp_offset_list_enabled_flag ) { | |
|     diff_cu_chroma_qp_offset_depth | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|     } | |
|     if( adaptive_color_trans_flag ) { | |
|       for( i = 0; i <= chroma_qp_offset_list_len_minus1; i++ ) { | |
|         alt_cb_qp_offset_list[ i ] | se(v) |
|         alt_cr_qp_offset_list[ i ] | se(v) |
|       } | |
|     } | |
|   } | |
|   log2_sao_offset_scale_luma | ue(v) |
|   log2_sao_offset_scale_chroma | ue(v) |
| } | |

VIDEO CODING DEVICE, VIDEO DECODING DEVICE, VIDEO CODING METHOD, VIDEO DECODING METHOD AND PROGRAM

CROSS-REFERENCE TO RELATED PATENT APPLICATIONS

This application is a continuation of U.S. patent application Ser. No. 15/516,223, filed Mar. 31, 2017, which is a National Stage Entry of International Application No. PCT/JP2015/004037, filed Aug. 12, 2015, which claims priority from Japanese Patent Application No. 2014-204392, filed Oct. 3, 2014. The entire contents of the above-referenced applications are expressly incorporated herein by reference.

TECHNICAL FIELD

The present invention relates to a video coding device and a video decoding device using an adaptive color transform in residual domain and a chroma (color difference) quantization offset.

BACKGROUND ART

In a video coding system based on high efficiency video coding (HEVC)/H.265, each frame of a digitized image is divided into coding tree units (CTUs) and the respective CTUs are coded in the order of raster scan. The CTU is divided into coding units (CUs) in a quad-tree structure and then coded. Each CU is divided into prediction units (PUs) and predicted. Moreover, a prediction error of each CU is divided into transform units (TUs) in a quad-tree structure and then frequency-transformed.

The CU is a coding unit for an intra prediction or inter-frame prediction.

The intra prediction (intra-frame prediction) is prediction for generating a prediction signal from a reconstructed image of a frame to be encoded. In HEVC/H.265, 33 types of angular intra prediction and the like are defined. In angular intra prediction, a reconstructed pixel around a block to be encoded is extrapolated in any of 33 directions depicted in FIG. 14, to generate an intra prediction signal.

In addition to angular intra prediction, DC prediction and planar prediction are specified as intra prediction. In DC prediction, a mean value of a reference image is used as the prediction values of all pixels in a TU to be predicted. In planar prediction, a prediction image is generated by linear interpolation from pixels in a reference image.

Inter-frame prediction is a prediction based on an image of a reconstructed frame (reference picture) different in display time from a frame to be encoded. Inter-frame prediction is also referred to as inter prediction. In inter prediction, an inter prediction signal is generated based on a reconstructed image block of a reference picture (using pixel interpolation if necessary).

A digital color image is composed of RGB digital images. A digital color image is generally transformed to signals in a color space other than the RGB space to increase the compression efficiency (to decrease the data amount) when the color image is transmitted through a transmission line. For example, the image signal is transformed to a signal in a color space (YCoCr space) where a combination of a luma signal (Y) and chroma signals (Cb, Cr) are composed.

A quantization parameter (QP) for the chroma signal is generated by transforming the QP for the luma signal by using an offset value "chroma_qp_index_offset." In HEVC, cb_qp_index_offset (a first chroma quantization offset) is applied to Cb, and cr_qp_index_offset (a second chroma quantization offset) is applied to Cr.

In RExt (range extension) of HEVC, the standardization of an extension function was carried out (see Non Patent Literature 1).

As a method for further increasing the compression efficiency of the extension function using RExt, there has been proposed a technique called "adaptive color transform in residual domain" in Non Patent Literature 2. As illustrated in FIG. 17, the adaptive color transform in residual domain is a technique of switching a prediction error signal of an image signal of the RGB space to a signal of the YCoCr space adaptively in block units (per block).

Specifically, it is possible to select, in block units (per block), whether to compress the prediction error signal of the RGB space directly or to transform the prediction error signal to a signal of the YCoCr space by using a forward color space transform matrix (see equation (1)) described below before compression. Moreover, FIG. 17 illustrates an example that data is compressed in the YCoCr space with respect to the shaded blocks and data is compressed in the RGB space with respect to other blocks.

Information on the color space used for the data compression of blocks is signaled by a cu_residual_csc_flag syntax. Equation "cu_residual_csc_flag=0" represents that the signal of the RGB space is compressed, while "cu_residual_csc_flag=1" represents that the signal is compressed after it is transformed to the YCoCr space.

If cu_residual_csc_flag=1, a receiver (a video decoding device) restores the signal of the YCoCr space to the signal of the RGB space by using a backward color space transform matrix described below and then performs decoding processing.

[Math. 1]

$$\text{Forward:} \begin{bmatrix} Y \\ Cb \\ Cr \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix} \Big/ 4 \quad (1)$$

$$\text{Backward:} \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Cb \\ Cr \end{bmatrix} \Big/ 4$$

Moreover, the norm is not constant in the aforementioned color transform matrix and therefore, when cu_residual_csc_flag=1, a different chroma quantization offset is added to the quantization parameter for each YCoCr component in quantization processing and inverse quantization processing of a block prediction error signal.

Moreover, Patent Literature 1 describes a video coding device and a video decoding device which perform signal processing which is different according to whether an input image signal is a signal of the RGB space or a signal of the YCoCr space. Specifically, when performing a weighted prediction based on the H.264/AVC, the video coding device applies the same offset to the R, G, and B signals and to the luma signal (Y signal) and applies different offsets to the chroma signals, regarding an offset added to a prediction signal. However, Patent Literature 1 does not teach any new knowledge regarding the chroma quantization offset.

CITATION LIST

Patent Literature

Patent Literature 1: Japanese Patent Application Laid-Open No. 2011-151683

Non Patent Literatures

Non Patent Literature 1: D. Flynn, et al.,"High Efficiency Video Coding (HEVC) Range Extensions text specification: Draft 7", JCTVC-Q1005, Joint Collaborative Team on Video Coding (JCT-VC) of ITU-T SG 16 WP 3 and ISO/IEC JTC 1/SC 29/WG 11 17th Meeting: Valencia, ES, 27 March-4 Apr. 2014

Non Patent Literature 2: L. Zhang et al., "SCCES Test 3.2.1: In-loop color-space transform", JCTVC-R0147, Joint Collaborative Team on Video Coding (JCT-VC) of ITU-T SG 16 WP 3 and ISO/IEC JTC 1/SC 29/WG 11 18th Meeting: Sapporo, JP, 30 Ju ne-9 Jul. 2014

SUMMARY OF INVENTION

Technical Problem

Next, referring to FIG. 18, the following describes the configuration and operation of a general video coding device which outputs a bitstream with each CU of each frame of a digitized image as an input image.

A video coding device illustrated in FIG. 18 includes a switch 101, a color space transformer 102, a switch 103, a frequency transformer/quantizer 104, an inverse quantizer/inverse frequency transformer 105, a switch 106, an inverse color space transformer 107, a switch 108, a buffer 109, a predictor 110, a prediction parameter determiner 111, an entropy encoder 112, a subtractor 115, and an adder 116.

The predictor 110 generates a prediction signal for a CU input image signal. Specifically, the predictor 110 generates a prediction signal (an intra-prediction signal) on the basis of intra prediction and generates a prediction signal (an inter-prediction signal) on the basis of inter-prediction.

A prediction image supplied from the predictor 110 is subtracted from an image input to the video coding device at the subtractor 115 and then input to the switch 101 as a prediction error image. In the example illustrated in FIG. 18, an input image signal is a signal of the RGB space. Moreover, the video coding device has a function of an adaptive color transform in residual domain. For example, the video coding device is able to adaptively switch a prediction error signal of an image signal of the RGB space to a signal of the YCoCr space in block units (per block).

When a prediction error signal of the RGB space is used, the switch 101 is set so that the prediction error image is input to the switch 103. When the prediction error signal of the YCoCr space is used, the switch 101 is set so that the prediction error image is input to the color space transformer 102. Moreover, the switch 101 sets an output destination of a prediction error image according to the control of the prediction parameter determiner 111, for example.

The color space transformer 102 transforms the prediction error signal of the RGB space to a signal of the YCoCr space by using the aforementioned equation (1) (a forward color space transform matrix) and then outputs the signal to the switch 103.

When a prediction error signal of the RGB space is used, the switch 103 outputs a prediction error signal, which has been received from the switch 101, to the frequency transformer/quantizer 104. When a prediction error signal of the YCoCr space is used, the switch 103 outputs a prediction error signal, which has been received from the color space transformer 102, to the frequency transformer/quantizer 104. Moreover, the switch 103 selects the input source of the prediction error image according to the control of the prediction parameter determiner 111, for example.

The frequency transformer/quantizer 104 frequency-transforms the prediction error image and quantizes the frequency-transformed prediction error image (a coefficient image). The entropy encoder 112 performs entropy coding of a prediction parameter and of a quantization coefficient image and then outputs a bitstream The inverse quantizer/inverse frequency transformer 105 inverse-quantizes the quantization coefficient image. Further, the inverse quantizer/inverse frequency transformer 105 performs inverse frequency transform on the inverse-quantized coefficient image. The inverse frequency transformed reconstructed prediction error image is input to the switch 106.

When the prediction error signal of the RGB space is used, the switch 106 is set so that the reconstructed prediction error image is input to the switch 108. When the prediction error signal of the YCoCr space is used, the switch 106 is set so that the reconstructed prediction error image is input to the inverse color space transformer 107. The switch 106 selects an output destination of the reconstructed prediction error image according to the control of the prediction parameter determiner 111.

The inverse color space transformer 107 transforms a reconstructed prediction error signal of the YCoCr space to a signal of the RGB space by using the aforementioned equation (1) (a backward color space transform matrix) and then outputs the to the switch 108.

The switch 108 selects the reconstructed prediction error signal received from the switch 106 when the prediction error signal of the RGB space is used. When the prediction error signal of the YCoCr space is used, the switch 108 selects the reconstructed prediction error signal received from the inverse color space transformer 107. Moreover, the switch 108 selects any of the reconstructed prediction error images according to the control of the prediction parameter determiner 111, for example.

The reconstructed prediction error image received from the switch 108 is supplied with a prediction signal by the adder 116 and then supplied as a reconstructed image to the buffer 109. The buffer 109 stores the reconstructed image.

The prediction parameter determiner 111 instructs the predictor 110 to decide the prediction parameter which minimizes coding cost by comparing the input image signal with the prediction signal, for example. The prediction parameter determiner 111 supplies the decided prediction parameter to the entropy encoder 112. The prediction parameter is information related to block prediction such as a prediction mode (intra prediction, inter-prediction), an intra prediction block size, an intra prediction direction, an inter-prediction block size, a motion vector, or the like.

The prediction parameter determiner 111 further instructs to decide whether the prediction error signal of the RGB space or the prediction error signal of the YCoCr space is used for each block.

The bitstream output from the video coding device is transmitted to the video decoding device. The video decoding device reconstructs images of a video by performing decoding processing. FIG. 19 is a block diagram illustrating an example of the configuration of a general video decoding device which decodes the bitstream output from a general video coding device to acquire a decoded image. Referring to FIG. 19, the configuration and operation of the general video decoding device will be described below.

The video decoding device illustrated in FIG. 19 includes an entropy decoder 212, an inverse quantizer/inverse frequency transformer 205, a switch 206, an inverse color space transformer 207, a switch 208, a buffer 209, a predictor 210, and an adder 216.

The entropy decoder 212 entropy-decodes an input bitstream. The entropy decoder 212 supplies a quantization coefficient image to the inverse quantizer/inverse frequency transformer 205 and supplies a prediction parameter to the predictor 210.

The inverse quantizer/inverse frequency transformer 205 inverse-quantizes the input quantization coefficient image and outputs it as a coefficient image. Furthermore, the inverse quantizer/inverse frequency transformer 205 transforms the coefficient image in the frequency domain to an image in the space domain and outputs it as a prediction error image. The prediction error image is input to the switch 206.

When the prediction error signal of the RGB space is used, the switch 206 is set so that the prediction error image is input to the switch 208. When the prediction error signal of the YCoCr space is used, the switch 206 is set so that the prediction error image is input to the inverse color space transformer 207. Moreover, the switch 206 is able to recognize whether the prediction error signal of the RGB space or the prediction error signal of the YCoCr space should be used according to signaling from the video coding device.

The inverse color space transformer 207 transforms the prediction error signal of the YCoCr space to a signal of the RGB space by using the aforementioned equation (1) (the backward color space transform matrix) and then outputs the prediction error signal to the switch 208.

When the prediction error signal of the RGB space is used, the switch 208 selects a prediction error signal received from the switch 206. When the prediction error signal of the YCoCr space is used, the switch 208 selects the prediction error signal received from the inverse color space transformer 207. The switch 208 is able to recognize whether the prediction error signal of the RGB space or the prediction error signal of the YCoCr space should be used according to signaling from the video coding device.

The prediction error image from the switch 208 is added to a prediction signal supplied from the predictor 210 at the adder 216 and then supplied as a reconstructed image to the buffer 209. The buffer 209 stores the reconstructed image.

Moreover, the reconstructed image stored in the buffer 209 is output as a decoded image (decoded video).

The buffer 209 stores images, which have been decoded in the past, as reference images. When performing the intra prediction, the predictor 210 generates a prediction image by predicting an image to be decoded on the basis of the adjacent reconstructed images, which have been decoded in the past within the image currently under decoding. When performing the inter-prediction, the predictor 210 generates a prediction image on the basis of reference images supplied from the buffer 209.

In RExt, a chroma quantization offset (a chroma QP offset) technique for a purpose of subjective image quality improvement has been proposed. The chroma quantization offset technique is used to adjust a quantization parameter for each color component by signaling chroma quantization offset values for a second color component and a third color component. Specifically, this technique is able to change the quantization strength.

The following syntaxes are provided for signaling chroma quantization offset values:
Picture unit: pps_cb_qp_offset/pps_cr_qp_offset/ slice_qp_delta_cb/slice_qp_delta_cr
Slice unit: slice_qp_delta_cb/slice_qp_delta_cr
Block unit: cu_chroma_qp_offset_idx The subjective image quality is able to be increased by adjusting the quantization strength for each color component by using any of the above syntaxes.

The video coding device illustrated in FIG. 18 and the video decoding device illustrated in FIG. 19 also apply a chroma quantization offset. As illustrated in FIG. 18, a previously determined chroma quantization offset is input to the video coding device.

In the video coding device, the frequency transformer/quantizer 104 increases or decreases the quantization parameter of the B component according to the first chroma quantization offset and increases or decreases the quantization parameter of the R component according to the second chroma quantization offset as illustrated in FIG. 20 when quantizing a coefficient image when the prediction error signal of the RGB space is used. The inverse quantizer/inverse frequency transformer 105 increases or decreases the inverse quantization parameter of the B component according to the first chroma quantization offset and increases or decreases the inverse quantization parameter of the R component according to the second chroma quantization offset.

When the prediction error signal of the YCoCr space is used, the frequency transformer/quantizer 104 increases or decreases the quantization parameter of the Co component according to the first chroma quantization offset and increases or decreases the quantization parameter of the Cr component according to the second chroma quantization offset as illustrated in FIG. 20 when quantizing a coefficient image. The inverse quantizer/inverse frequency transformer 105 increases or decreases the inverse quantization parameter of the Co component according to the first chroma quantization offset and increases or decreases the inverse quantization parameter of the Cr component according to the second chroma quantization offset.

In the video decoding device, the inverse quantizer/inverse frequency transformer 205 operates in the same manner as the inverse quantizer/inverse frequency transformer 105 in the video coding device.

The chroma quantization offset technique is a technique of signaling the chroma quantization offset values for the second color component and the third color component. Therefore, if the adaptive color transform in residual domain is combined with the chroma quantization offset, the block compressed in the RGB space and the block compressed in the YCoCr space share the quantization strength as illustrated in FIG. 20. Thereby, the quantization strength cannot be set appropriately according to the color space. Thus, the subjective image quality improvement effect cannot be acquired by the chroma quantization offset technique.

It is an object of the present invention to provide a video coding device, a video decoding device, a video coding method, a video decoding method, and a program capable of preventing a deterioration in the subjective image quality improvement effect in the case where the adaptive color transform in residual domain and the chroma quantization offset are used in combination.

Solution to Problem

According to the present invention, there is provided a video coding device capable of selecting, from among a plurality of color spaces, a color space of a prediction error signal in coded block units, the device including: adaptive chroma quantization offset derivation means for deriving a chroma quantization offset for each color space; and inverse quantization means for inverse-quantizing a quantization coefficient image by using the chroma quantization offset for each color space.

Furthermore, according to the present invention, there is provided a video decoding device capable of selecting, from among a plurality of color spaces, a color space of a prediction error signal in coded block units, the device including: adaptive chroma quantization offset derivation means for deriving a chroma quantization offset for each color space; and inverse quantization means for inverse-quantizing a quantization coefficient image by using the chroma quantization offset for each color space.

Furthermore, according to the present invention, there is provided a video coding method capable of selecting, from among a plurality of color spaces, a color space of a prediction error signal in coded block units, the method including: deriving a chroma quantization offset for each color space; and inverse-quantizing a quantization coefficient image by using the chroma quantization offset for each color space.

Furthermore, according to the present invention, there is provided a video decoding method capable of selecting, from among a plurality of color spaces, a color space of a prediction error signal in coded block units, the method including: deriving a chroma quantization offset for each color space; and inverse-quantizing a quantization coefficient image by using the chroma quantization offset for each color space.

Furthermore, according to the present invention, there is provided a video coding program for performing a video coding method capable of selecting, from among a plurality of color spaces, a color space of a prediction error signal in coded block units, the program causing a computer to perform: a process of deriving a chroma quantization offset for each color space; and a process of inverse-quantizing a quantization coefficient image by using the chroma quantization offset for each color space.

Furthermore, according to the present invention, there is provided a video decoding program for performing a video decoding method capable of selecting, from among a plurality of color spaces, a color space of a prediction error signal in coded block units, the program causing a computer to perform: a process of deriving a chroma quantization offset for each color space; and a process of inverse-quantizing a quantization coefficient image by using the chroma quantization offset for each color space.

Advantageous Effects of Invention

According to the present invention, it is possible to prevent a deterioration in a subjective image quality improvement effect.

BRIEF DESCRIPTION OF DRAWINGS

FIG. 5 is an explanatory diagram illustrating an example of a syntax for transmitting alt_pps_cb_qp_offset and alt_pps_cr_qp_offset.

FIG. 6 is an explanatory diagram illustrating an example of a syntax for transmitting alt_slice_qp_delta_cb and alt_slice_qp_delta_cr.

FIG. 7 is an explanatory diagram illustrating an example of a syntax for transmitting alt_slice_qp_delta_cb and alt_slice_qp_delta_cr.

FIG. 8 is an explanatory diagram illustrating an example of a syntax for transmitting cb_qp_offset_list [i] and cr_qp_offset_list [i].

FIG. 9 is an explanatory diagram illustrating an example of a syntax for transmitting alt_cb_qp_offset_list [i] and alt_cr_qp_offset_list [i].

DESCRIPTION OF EMBODIMENT

Exemplary Embodiment 1

Figure 1:
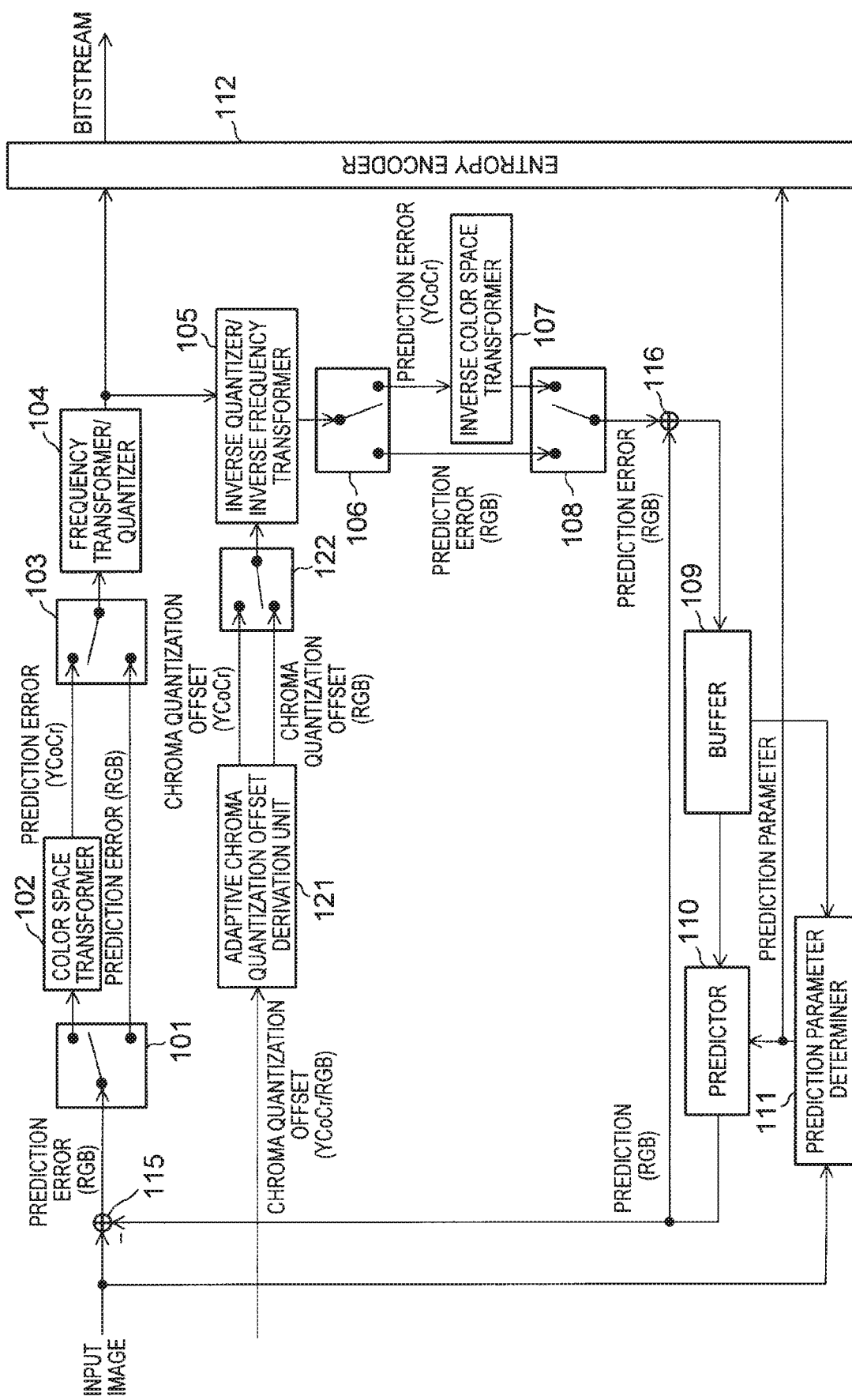
FIG. 1 is a block diagram illustrating an exemplary embodiment of a video coding device.

FIG. 1 is a block diagram illustrating a first exemplary embodiment of a video coding device. Referring to FIG. 1, description will be made on the configuration of a video coding device which outputs a bitstream with each frame of a digitized video as an input image.

Figure 18:
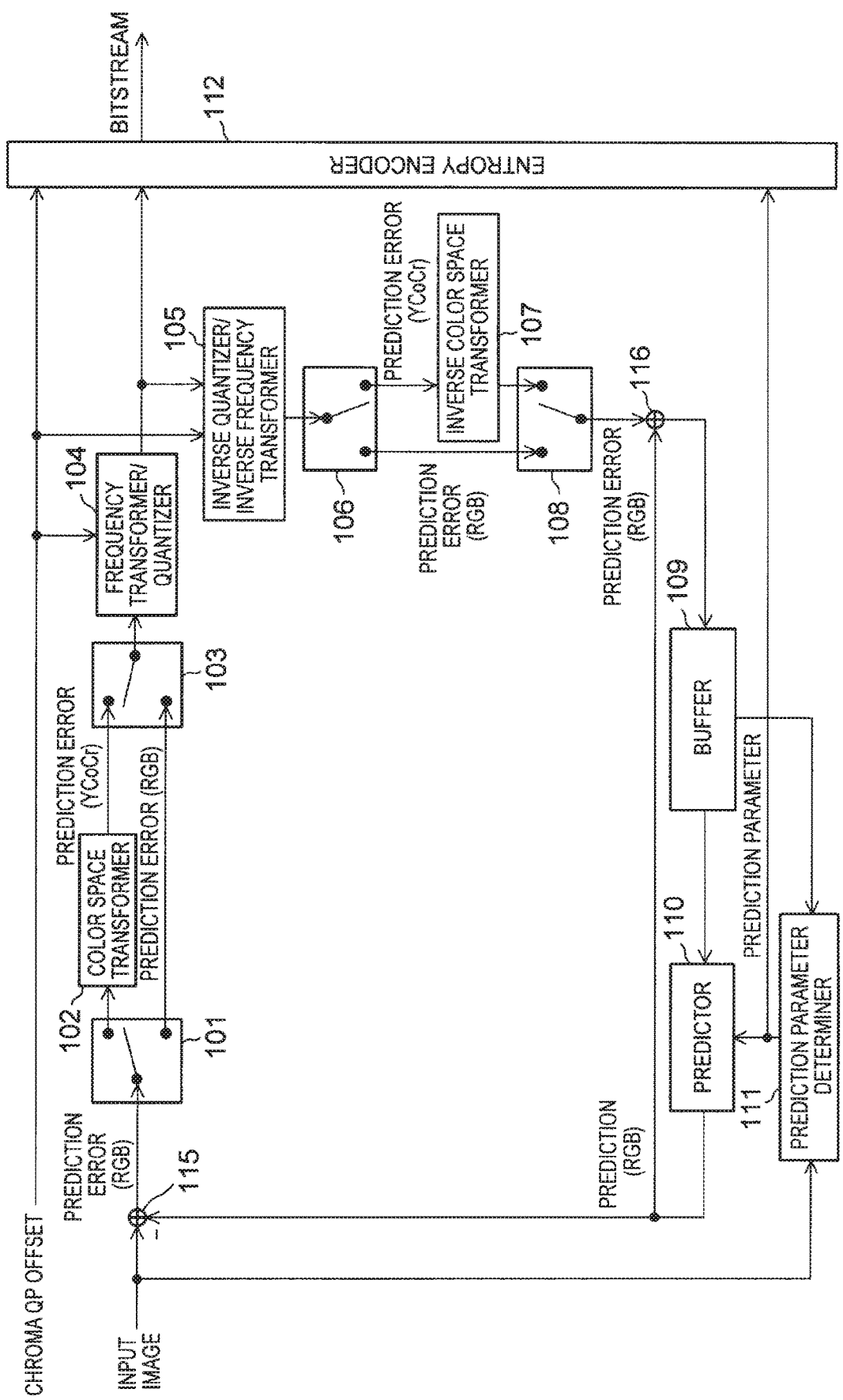
FIG. 18 is a block diagram illustrating the configuration of a general video coding device.

As illustrated in FIG. 1, the video coding device of the first exemplary embodiment includes a switch 101, a color space transformer 102, a switch 103, a frequency transformer/quantizer 104, an inverse quantizer/inverse frequency transformer 105, a switch 106, an inverse color space transformer 107, a switch 108, a buffer 109, a predictor 110, a prediction parameter determiner 111, an entropy encoder 112, a subtractor 115, and an adder 116, similarly to the general video coding device illustrated in FIG. 18.

As illustrated in FIG. 1, the video coding device further includes an adaptive chroma quantization offset derivation unit 121 and a switch 122.

Since the switch 101, the color space transformer 102, the switch 103, the frequency transformer/quantizer 104, the inverse quantizer/inverse frequency transformer 105, the switch 106, the inverse color space transformer 107, the switch 108, the buffer 109, the predictor 110, the subtractor 115, and the adder 116 operate in the same manner as those illustrated in FIG. 18, the following mainly describes the operations of the adaptive chroma quantization offset derivation unit 121 and the switch 122 and the operations of the prediction parameter determiner 111 and the entropy encoder 112 related to the signaling of the chroma quantization offsets. Moreover, the adaptive chroma quantization offset derivation unit 121 receives an input of a chroma quantization offset for the RGB space and an input of a chroma quantization offset for the YCoCr space.

Figure 2:
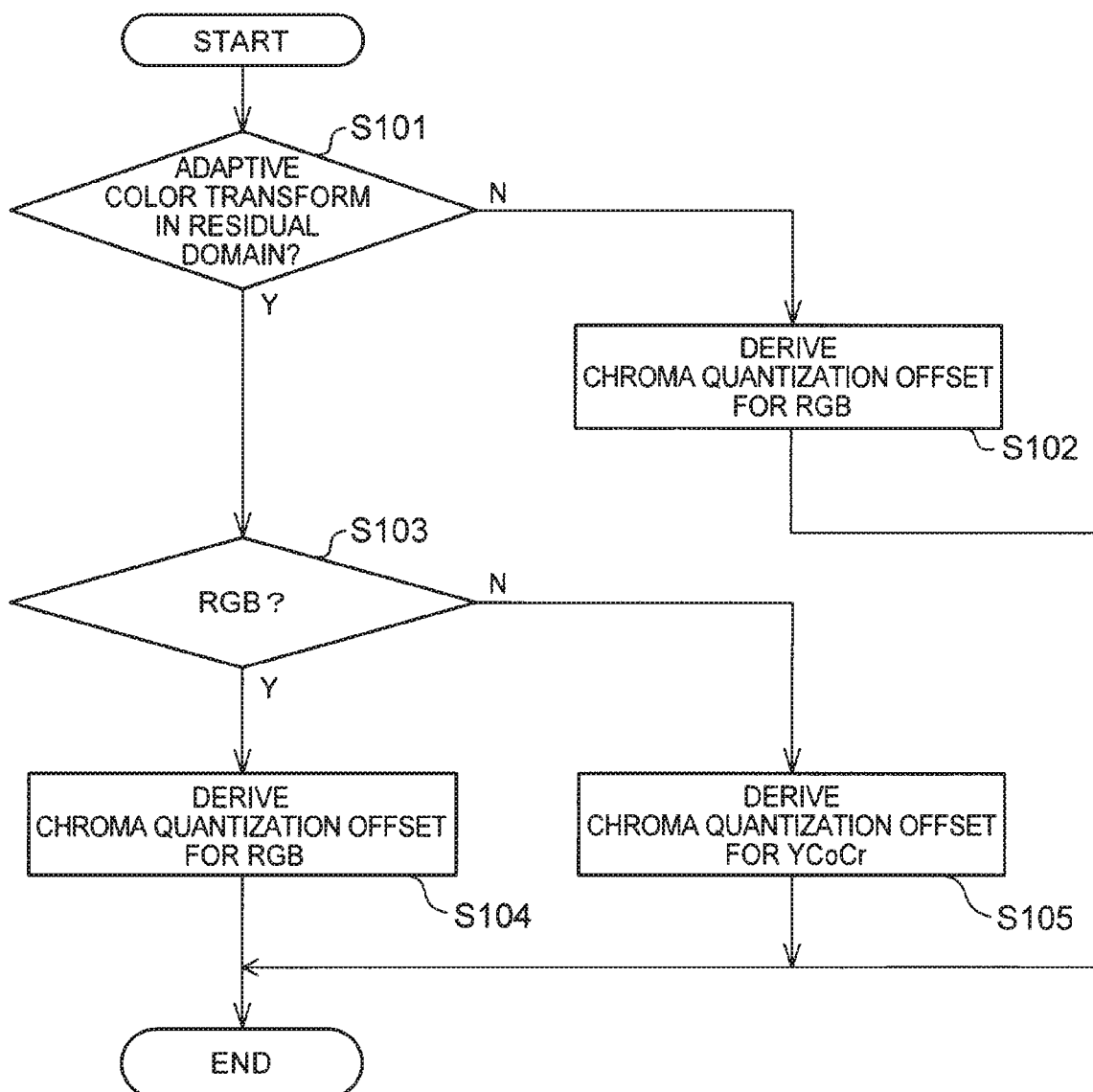
FIG. 2 is a flowchart illustrating processing related to signaling of chroma quantization offsets.

FIG. 2 is a flowchart illustrating processing related to signaling of chroma quantization offsets.

The video coding device signals information indicating whether the adaptive color transform in residual domain is performed or not by adaptive_color_trans_flag. Moreover, when performing the adaptive color transform in residual domain, the video coding device signals information indicating the color space of the block by cu_residual_csc_flag.

Unless the adaptive color transform in residual domain is performed, the entropy encoder 112 signals adaptive_color_trans_flag=0 and transmits the chroma quantization offset for the RGB space derived by the adaptive chroma quantization offset (the chroma quantization offset for the RGB space input by the adaptive chroma quantization offset derivation unit 121) derivation unit 121 by using the following syntax (steps S101 and S102). If the adaptive color transform in residual domain is performed, the entropy encoder 112 sets adaptive_color_trans_flag=1. In addition, when compression is performed in the RGB space, the entropy encoder 112 transmits the chroma quantization offset for the RGB space derived by the adaptive chroma quantization offset derivation unit 121 by using the following syntax (steps S103 and S104).

Picture unit:
pps_cb_qp_offset/pps_cr_qp_offset/slice_qp_delta_cb/
  slice_qp_delta_cr
  Slice unit: slice_qp_delta_cb/slice_qp_delta_cr When the compression is performed in the YCoCr space, the entropy encoder 112 transmits the chroma quantization offset for the YCoCr space derived by the adaptive chroma quantization offset derivation unit 121 by using the following syntax (steps S103 and S105).

Picture unit:
alt_pps_cb_qp_offset/alt_pps_cr_qp_offset/alt_
  slice_qp_delta_cb/alt_slice_qp_delta_cr
  Slice unit: alt_slice_qp_delta_cb/alt_slice_qp_delta_cr Moreover, in the case where the adaptive color transform in residual domain is performed, the entropy encoder 112 signals cu_residual_csc_flag=1 when the compression is performed in the YCoCr space (when the compression is not performed in the RGB space). The adaptive chroma quantization offset derivation unit 121 outputs the derived chroma quantization offsets (the first chroma quantization offset and the second chroma quantization offset) for the YCoCr space to the switch 122.

When the compression is performed in the RGB space, the entropy encoder 112 signals cu_residual_csc_flag=0. The adaptive chroma quantization offset derivation unit 121 outputs the derived chroma quantization offsets (the first chroma quantization offset and the second chroma quantization offset) for the RGB space to the switch 122.

Moreover, the adaptive chroma quantization offset derivation unit 121 recognizes whether the compression is performed in the RGB space or in the YCoCr space according to cu_residual_csc_flag.

Moreover, the frequency transformer/quantizer 104 adjusts the quantization parameter by using the chroma quantization offset decided by the prediction parameter determiner 111.

The prediction parameter determiner 111 stores the values of the chroma quantization offsets for the RGB space and the values of the chroma quantization offsets for the YCoCr space in advance, for example, and appropriately supplies the values of the chroma quantization offsets for the RGB space or the values of the chroma quantization offsets for the YCoCr space to the frequency transformer/quantizer 104. In that case, the values of the chroma quantization offsets for the RGB space and the values of the chroma quantization offsets for the YCoCr space are included in the prediction parameters supplied to the entropy encoder 112. The entropy encoder 112 signals the values of the chroma quantization offsets for the RGB space and the values of the chroma quantization offsets for the YCoCr space.

In this case, the video coding device explicitly signals the chroma quantization offsets. Furthermore, the video coding device signals the values of the chroma quantization offsets.

Moreover, the operations of the adaptive chroma quantization offset derivation unit 121 will be described in more detail in the second exemplary embodiment.

The operations of the video coding device other than the above operations are the same as the operations of the video coding device illustrated in FIG. 18.

Exemplary Embodiment 2

Figure 3:
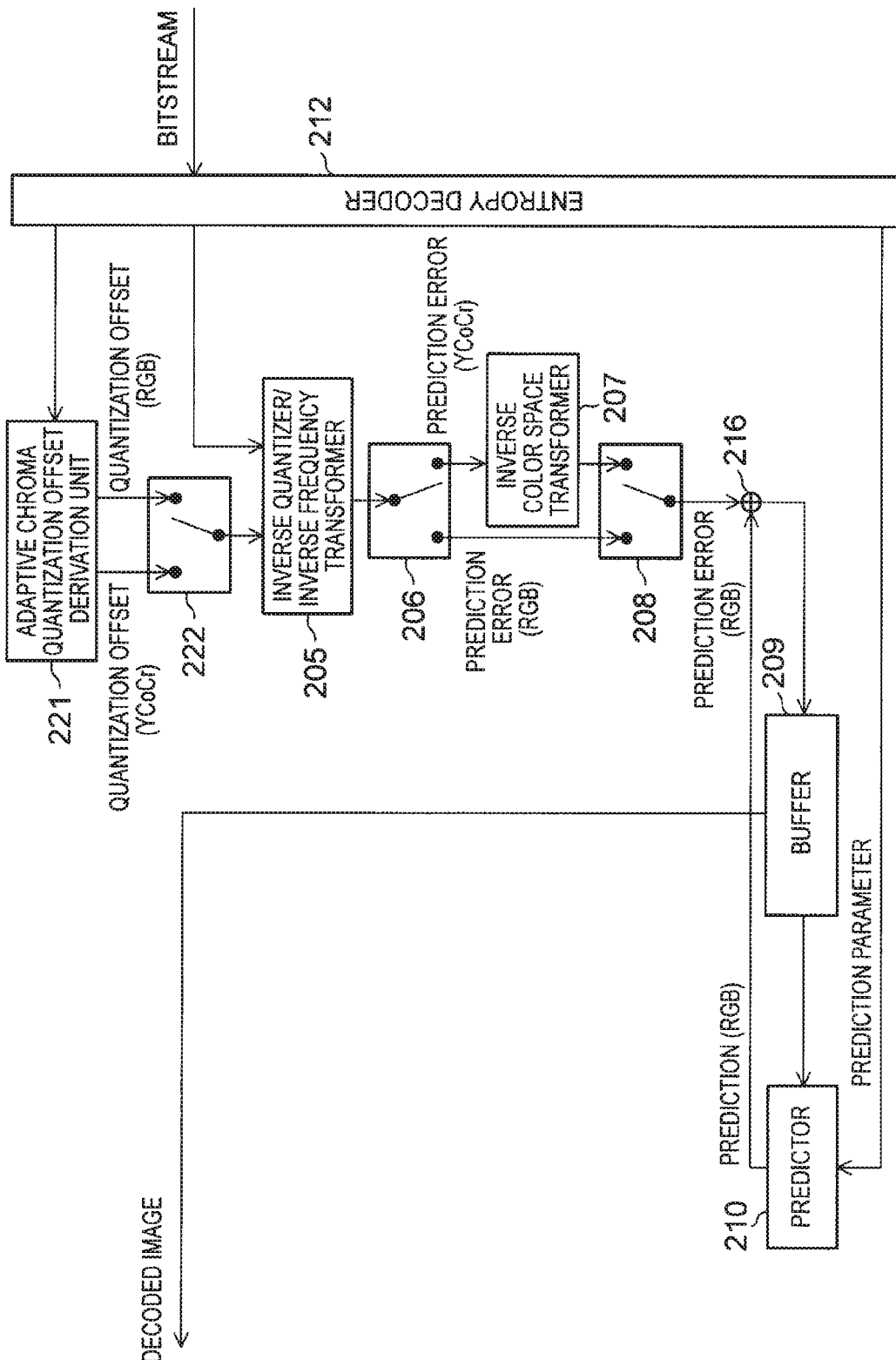
FIG. 3 is a block diagram illustrating an exemplary embodiment of a video decoding device.

FIG. 3 is a block diagram illustrating the configuration of a video decoding device which acquires a decoded image by decoding the bitstream output from the video coding device which signals chroma quantization offsets. Referring to FIG. 3, the configuration of the video decoding device of the second exemplary embodiment will be described.

Figure 19:
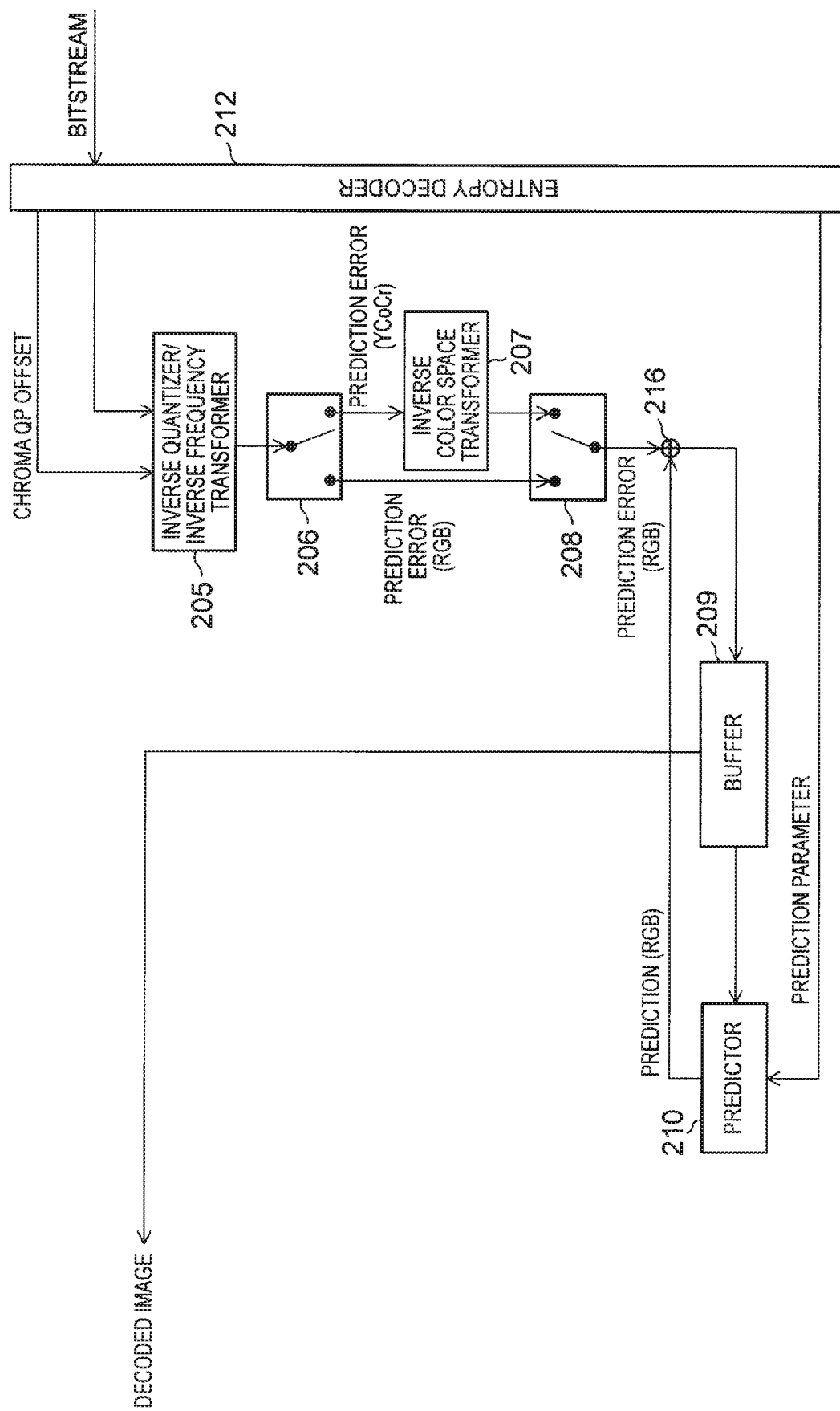
FIG. 19 is a block diagram illustrating the configuration of a general video decoding device.

As illustrated in FIG. 3, the video decoding device of this exemplary embodiment includes an entropy decoder 212, an inverse quantizer/inverse frequency transformer 205, a switch 206, an inverse color space transformer 207, a switch 208, a buffer 209, a predictor 210, and an adder 216 similarly to the general video decoding device illustrated in FIG. 19.

As illustrated in FIG. 3, the video decoding device further includes an adaptive chroma quantization offset derivation unit 221 and a switch 222.

Since the inverse quantizer/inverse frequency transformer 205, the switch 206, the inverse color space transformer 207, the switch 208, the buffer 209, the predictor 210, and the adder 216 operate in the same manner as those illustrated in FIG. 19, the following mainly describes the operations of the adaptive chroma quantization offset derivation unit 221 and the switch 222 and the operations of the entropy decoder 212 related to derivation of the chroma quantization offsets.

Figure 4:
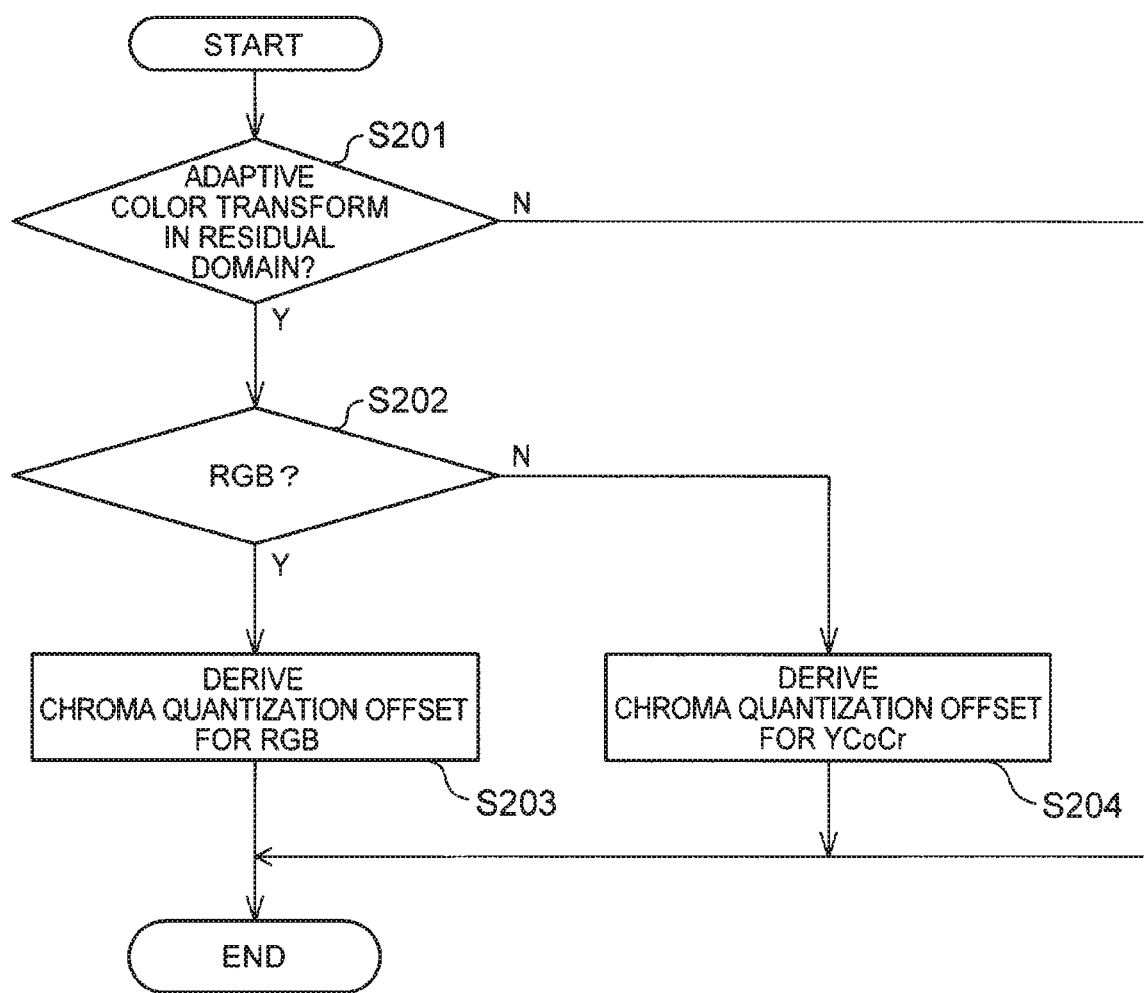
FIG. 4 is a flowchart illustrating processing related to derivation of the chroma quantization offsets.

FIG. 4 is a flowchart illustrating processing related to derivation of the chroma quantization offsets.

If the entropy decoder 212 parses a bitstream to get adaptive_color_trans_flag=1 (indicating that the adaptive color transform in residual domain is to be performed) (step S201) and gets cu_residual_csc_flag=1 (indicating that data is compressed in the YCoCr space) (step S202), the adaptive chroma quantization offset derivation unit 221 derives the chroma quantization offsets for the YCoCr space (step S204). If the entropy decoder 212 gets cu_residual_csc_flag=0 (indicating that data is compressed in the RGB space) (step S202), the adaptive chroma quantization offset derivation unit 221 derives the chroma quantization offsets for the RGB space (step S203).

The adaptive chroma quantization offset derivation unit 221 derives the chroma quantization offsets for the RGB space (the first chroma quantization offset $_qPi_{C_b}$ and the second chroma quantization offset $_qPi_{C_r}$) as follows.

$$qPi_{C_b}=\text{Clip3}(-\text{QpBdOffset}_C, 57, Qp_Y+\text{pps\_cb\_qp\_off-}$$
$$\text{set}+\text{slice\_cb\_qp\_offset}+\text{CuQpOffset}_{C_b})$$

$$qPi_{C_r}=\text{Clip3}(-\text{QpBdOffset}_C, 57, Qp_Y+\text{pps\_cr\_qp\_off-}$$
$$\text{set}+\text{slice\_cr\_qp\_offset}+\text{CuQpOffset}_{C_r}) \quad (2)$$

In equation (2), Clip3 (x, y, z) is a function of clipping an input z into the [x, y] range. $Qp_Y$ is a quantization parameter of a first color component, $\text{CuQpOffset}_{C_b}$ is a chroma quantization offset for each block of a second color component, and $\text{CuQpOffset}_{C_r}$ is a chroma quantization offset for each block of a third color component. Although descriptions $qPi_{C_b}$ and $qPi_{C_r}$ are used, $qPi_{C_b}$ corresponds to a chroma quantization offset for the B component and $qPi_{C_r}$ corresponds to a chroma quantization offset for the R component in the case of the RGB space in which the first color component is the G component, the second color component is the B component, and the third color component is the R component.

The adaptive chroma quantization offset derivation unit 221 derives the chroma quantization offsets for the YCoCr space (the first chroma quantization offset $qPi_{C_b}$ and the second chroma quantization offset $qPi_{C_r}$) as described in the following equation (3).

$$qPi_{C_b}=\text{Clip3}(-\text{QpBdOffset}_C, 57, Qp_Y+\text{alt\_pp-}$$
$$\text{s\_cb\_qp\_offset}+\text{alt\_slice\_cb\_qp\_offset}+$$
$$\text{CuQpOffset}_{C_b})$$

$$qPi_{C_r}=\text{Clip3}(-\text{QpBdOffset}_C, 57, Qp_Y+\text{alt\_pp-}$$
$$\text{s\_cr\_qp\_offset}+\text{alt\_slice\_cr\_qp\_offset}+$$
$$\text{CuQpOffset}_{C_r}) \quad (3)$$

Moreover, quantization parameter ($Qp'_{C_b}$, $Qp'_{C_r}$) is calculated as described in the following equation (4).

$$Qp'_{C_b}=qP_{C_b}+\text{QpBdOffset}_C$$

$$Qp'_{C_r}=qP_{C_r}+\text{QpBdOffset}_C \quad (4)$$

The following describes a specific example of the procedure for deriving a chroma quantization offset. In the description below, wordings enclosed by quotation marks indicate characteristics in this exemplary embodiment.

"If cu_residual_csc_flag is equal to 0," the variables $qP_{C_b}$ and $qP_{C_r}$ are derived as follows:

$$qPi_{C_b}=\text{Clip3}(-\text{QpBdOffset}_C, 57, Qp_Y+\text{pps\_cb\_qp\_off-}$$
$$\text{set}+\text{slice\_cb\_qp\_offset}+\text{CuQpOffset}_{C_b})$$

$$qPi_{C_r}=\text{Clip3}(-\text{QpBdOffset}_C, 57, Qp_Y+\text{pps\_cr\_qp\_off-}$$
$$\text{set}+\text{slice\_cr\_qp\_offset}+\text{CuQpOffset}_{C_r})$$

"Otherwise (cu_residual_csc_flag is equal to 1), the variables $qP_{C_b}$ and $qP_{C_r}$ are derived as follows:"

"$qPi_{C_b}$=Clip3(-QpBdOffset$_C$, 57, $Qp_Y$+alt_pps_cb_qp_offset+alt_slice_cb_qp_offset+CuQpOffset$_{C_r}$)"

"$qPi_{C_r}$=Clip3(-QpBdOffset$_C$, 57, $Qp_Y$+alt_pps_cr_qp_offset+alt_slice_cr_qp_offset+CuQpOffset$_{C_r}$)"

If ChromaArrayType is equal to 1, the variables $qP_{C_b}$ and $qP_{C_r}$ are set equal to the value of $Qp_C$ as specified in Predetermined Table based on the index qPi equal to $qPi_{C_b}$ and $qPi_{C_r}$, respectively.

Otherwise, the variables $qP_{C_b}$ and $qP_{C_r}$ are set equal to Min (qPi, 51), based on the index qPi equal to $qPi_{C_b}$ and $qPi_{C_r}$, respectively.

The chroma quantization parameters for the Cb and Cr components, $Qp'_{C_b}$ and $Qp'_{C_r}$, are derived as follows:

$$Qp'_{C_b}=qP_{C_b}+\text{QpBdOffset}_C$$

$$QP'_{C_r}=qP_{C_r}+\text{QpBdOffset}_C$$

The inverse quantizer/inverse frequency transformer 205 increases or decreases the quantization parameter according to the chroma quantization offsets from the adaptive chroma quantization offset derivation unit 221 when inverse-quantizing the input quantization coefficient image and outputting it as a coefficient image.

Exemplary Embodiment 3

Subsequently, a video coding device according to a third exemplary embodiment will be described. FIG. 5 is an explanatory diagram illustrating an example of a syntax for transmitting alt_pps_cb_qp_offset and alt_pps_cr_qp_offset (an improvement of a syntax described in "7.3.2.3.2 Picture parameter set range extensions syntax" of Non Patent Literature 1). In FIG. 5, wordings written in italics indicate characteristics of this exemplary embodiment.

FIGS. 6 and 7 are explanatory diagrams illustrating examples of syntaxes for transmitting alt_slice_qp_delta_cb and alt_slice_qp_delta_cr (improvements of a syntax described in "7.3.6.1 General slice segment header syntax"). In FIGS. 6 and 7, wordings written in italics indicate characteristics of this exemplary embodiment.

Moreover, the configuration of the video coding device of this exemplary embodiment is the same as the configuration illustrated in FIG. 1. In the video coding device, the entropy encoder 112 transmits information by which the chroma quantization offsets for the RGB space are able to be identified (for example, an index specifying a data table in which chroma quantization offsets retained in the video decoding device are set or values of the chroma quantization offsets) to the video decoding device.

When data is compressed in the YCoCr space, the entropy encoder 112 signals the information by which the chroma quantization offsets for the YCoCr space are able to be identified (for example, the values of the chroma quantization offsets themselves) by using the syntaxes illustrated in FIG. 5 and FIGS. 6 and 7.

Exemplary Embodiment 4

Subsequently, a video decoding device according to a fourth exemplary embodiment will be described. The video decoding device of this exemplary embodiment corresponds to the video coding device of the third exemplary embodiment. Note that the configuration of the video decoding device of this exemplary embodiment is the same as the configuration illustrated in FIG. 3.

When the entropy decoder 212 interprets that data is compressed in the YCoCr space by using the syntaxes illustrated in FIG. 5 and FIGS. 6 and 7 in the video decoding device, the adaptive chroma quantization offset derivation unit 221 derives the chroma quantization offsets in the same manner as in the second exemplary embodiment.

Moreover, in the video coding device, the adaptive chroma quantization offset derivation unit 121 operates in the same manner as the adaptive chroma quantization offset derivation unit 221.

Exemplary Embodiment 5

Subsequently, a video coding device according to a fifth exemplary embodiment will be described. FIG. 8 is an explanatory diagram illustrating an example of a syntax for additionally transmitting cb_qp_offset_list [i] and cr_qp_offset_list [i] for the YCoCr space (an improvement of a syntax described in "7.3.2.3.2 Picture parameter set range extensions syntax" of NPL 1). In FIG. 8, wordings written in italics indicate characteristics of this exemplary embodiment (specifically, the parts indicate that the size of cb_qp_offset_list/cr_qp_offset_list [the range of chroma_qp_offset_list_len_minus1] is increased according to the value of adaptive_color_trans_flag). In the video coding device according to this exemplary embodiment, the quantization offsets are able to be switched between those for the RGB space and those for the YCoCr space in block units by adjusting the value of the cu_chroma_qp_offset_idx syntax transmitted in block units according to the value of the cu_residual_csc_flag syntax.

Note that the configuration of the video coding device of this exemplary embodiment is the same as the configuration illustrated in FIG. 1. In the video coding device, the entropy encoder 112 transmits information by which the chroma quantization offsets for the RGB space are able to be identified (for example, a cu_chroma_qp_offset_idx syntax which is an index for specifying a data table in which chroma quantization offsets retained in the video decoding device are set) to the video decoding device.

According to this exemplary embodiment, in the video coding device, the entropy encoder 112 transmits information by which the chroma quantization offsets for the YCoCr space are able to be identified (for example, a cu_chroma_qp_offset_idx syntax which is an index for specifying a data table in which chroma quantization offsets retained in the video decoding device are set) to the video decoding device. In the video decoding device of this exemplary embodiment, the chroma quantization offsets are able to be switched between those for the RGB space and those for the YCoCr space in block units on the basis of the value of the cu_chroma_qp_offset_idx syntax transmitted in block units according to the value of the cu_residual_csc_flag syntax.

Moreover, wordings written in italics (cb_qp_offset_list [i] and cr_qp_offset_list [i]) correspond to the chroma quantization offsets for the YCoCr space described above in FIG. 8.

Exemplary Embodiment 6

Next, a video decoding device according to a sixth exemplary embodiment will be described. The video decoding device of this exemplary embodiment corresponds to the video coding device of the fifth exemplary embodiment. Moreover, the configuration of the video decoding device of this exemplary embodiment is the same as the configuration illustrated in FIG. 3.

When the entropy decoder 212 interprets that data is compressed in the YCoCr space by the syntax illustrated in FIG. 8 in the video decoding device, the chroma quantization offsets are read from the data table specified by the index, for example, and the adaptive chroma quantization offset derivation unit 221 calculates the chroma quantization parameter in the same manner as in the second exemplary embodiment.

Moreover, in the video coding device, the adaptive chroma quantization offset derivation unit 121 operates in the same manner as the adaptive chroma quantization offset derivation unit 221.

Exemplary Embodiment 7

Next, a video coding device according to a seventh exemplary embodiment will be described. FIG. 9 is an explanatory diagram illustrating an example of a syntax for transmitting alt_cb_qp_offset_list [i] and alt_cr_qp_offset_list [i] for the YCoCr space (an improvement of a syntax described in "7.3.2.3.2 Picture parameter set range extensions syntax" described in NPL 1). In FIG. 9, wordings written in italics indicate characteristics of this exemplary embodiment.

In the seventh exemplary embodiment, the interpretation of the value of the cu_chroma_qp_offset_idx syntax changes according to the value of the cu_residual_csc_flag syntax in comparison with the fifth exemplary embodiment as described later, and therefore the bits of the cu_chroma_qp_offset_idx syntax transmitted for each block are able to be saved. For example, in the seventh exemplary embodiment, even if cu_chroma_qp_offset_idx=0, cb_qp_offset_list [0] and cr_qp_offset_list [0] for RGB are derived when cu_residual_csc_flag=0, and alt_cb_qp_offset_list [0] and alt_cr_qp_offset_list [0] for YCoCr are derived when cu_residual_csc_flag=1. On the other hand, in the fifth exemplary embodiment, when cu_chroma_qp_offset_idx=0, cb_qp_offset_list [0] and cr_qp_offset_list [0] for RGB are derived. Therefore, in the fifth exemplary embodiment, if the list size is 4 (when chroma_qp_offset_list_len_minus1 is 3), it is necessary to transmit cu_chroma_qp_offset_idx=4 in order to derive cb_qp_offset_list [4] and alt_cr_qp_offset_list [4] for YCoCr.

Moreover, the configuration of the video coding device of this exemplary embodiment is the same as the configuration illustrated in FIG. 1. In the video coding device, the entropy encoder 112 transmits information by which the chroma quantization offsets for the RGB space are able to be identified (for example, an index for specifying a data table in which the chroma quantization offsets retained in the video decoding device are set) to the video decoding device.

According to this exemplary embodiment, in the video coding device, the entropy encoder 112 transmits information by which the chroma quantization offsets for the YCoCr space are able to be identified (for example, an index for specifying a data table in which the chroma quantization offsets retained in the video decoding device are set) to the video decoding device.

Exemplary Embodiment 8

Subsequently, a video decoding device according to an eighth exemplary embodiment will be described. The video decoding device of this exemplary embodiment corresponds to the video coding device of the seventh exemplary embodiment. Moreover, the configuration of the video decoding device of this exemplary embodiment is the same as the configuration illustrated in FIG. 3.

When the entropy decoder 212 interprets that data is compressed in the YCoCr space by the syntax illustrated in FIG. 9 in the video decoding device, the chroma quantization offsets are read from the data table specified by the index, for example, and the adaptive chroma quantization offset derivation unit 221 calculates the chroma quantization parameter in the same manner as in the second exemplary embodiment.

Moreover, in the video coding device, the adaptive chroma quantization offset derivation unit 121 operates in the same manner as the adaptive chroma quantization offset derivation unit 221.

The following describes a specific example of a procedure for deriving chroma quantization offsets. In the following description, wordings enclosed by quotation marks indicate characteristics in this exemplary embodiment.

cu_chroma_qp_offset_idx, when present, specifies the index into the cb_qp_offset_list [ ] and cr_qp_offset_list [ ] or the alt_cb_qp_offset_list [ ] and alt_cr_qp_offset_list [ ] that is used to determine the value of CuQpOffsetCb and CuQpOffsetCr. When present, the value of cu_chroma_qp_offset_idx shall be in the range of 0 to chroma_qp_offset_list_len_minus1, inclusive. When not present, the value of cu_chroma_qp_offset_idx is inferred to be equal to 0. When cu_chroma_qp_offset_flag is present, the following applies:

The variable IsCuChromaQpOffsetCoded is set equal to 1.
The variables CuQpOffsetCb and CuQpOffsetCr are derived as follows:
If cu_chroma_qp_offset_flag is equal to 1 and "cu_residual_csc_flag is equal to 0", the following applies:
CuQpOffsetCb=cb_qp_offset_list [cu_chroma_qp_offset_idx]
CuQpOffsetCr=cr_qp_offset_list [cu_chroma_qp_offset_idx]
"Otherwise if cu_chroma_qp_offset_flag is equal to 1 and cu_residual_csc_flag is equal to 1, the following applies:"
"CuQpOffsetCb=alt_cb_qp_offset_list [cu_chroma_qp_offset_idx]"
"CuQpOffsetCr=alt_cr_qp_offset_list [cu_chroma_qp_offset_idx]"
Otherwise (cu_chroma_qp_offset_flag is equal to 0), CuQpOffsetCb and CuQpOffsetCr are both set equal to 0.

Exemplary Embodiment 9

Although the video coding device explicitly signals the chroma quantization offsets in the above exemplary embodiments, the signaling of the chroma quantization offsets may be omitted though it is signaled that the color space of the prediction error signal is selected in block units. In the present description, the above is referred to as chroma quantization offsets are implicitly signaled.

In the case where the video coding device implicitly signals chroma quantization offsets, the entropy encoder signals adaptive_color_trans_flag=1 and then signals cu_residual_csc_flag in block units, for example, while not signaling information by which the values of the chroma quantization offsets are able to be identified.

In case where the entropy decoder parses a bitstream to get adaptive_color_trans_flag=1 in the video decoding device and gets cu_residual_csc_flag=0 (indicating that data is compressed in the RGB space), the adaptive chroma quantization offset derivation unit 221 reads out the values of the chroma quantization offsets for the RGB space previously stored in the video decoding device. In addition, if the entropy decoder gets cu_residual_csc_flag=1 (indicating that data is compressed in the YCoCr space), the adaptive chroma quantization offset derivation unit 221 calculates the values of the chroma quantization offsets for the YCoCr space from the values of the previously-stored chroma quantization offsets for the RGB space.

Since the chroma quantization offsets for the RGB space correlate with the chroma quantization offsets for the YCoCr space to some extent, in other words, since it is possible to define a calculation formula for calculating the chroma quantization offsets for the YCoCr space from the chroma quantization offsets for the RGB space, the adaptive chroma quantization offset derivation unit 221 is able to derive the chroma quantization offsets for the YCoCr space by using the calculation formula.

Specifically, the video decoding device implicitly derives the chroma quantization offsets.

Moreover, in the video coding device, the adaptive chroma quantization offset derivation unit 121 operates in the same manner as the adaptive chroma quantization offset derivation unit 221.

Moreover, if the video coding device implicitly signals chroma quantization offsets, the amount of data to be transmitted is able to be reduced.

Figure 20:
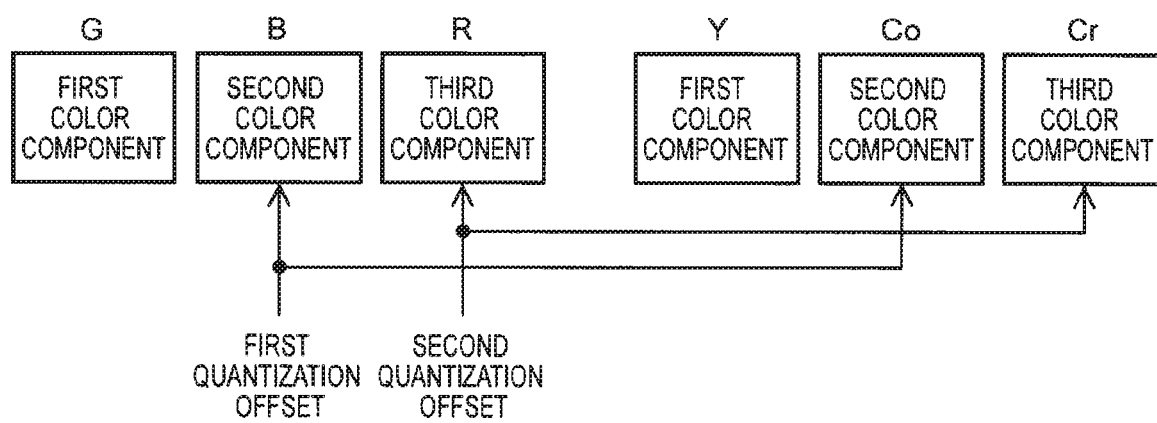
FIG. 20 is an explanatory diagram illustrating an example of the use of chroma quantization offsets.

Although the RGB space and the YCoCr space are illustrated as two color spaces in the above exemplary embodiments, the system of the above exemplary embodiments is applicable even if one or both of the two color spaces are other color spaces. Furthermore, although the first color component G, the second color component B, and the third color component R are used in the RGB space in the above exemplary embodiments (see FIG. 20), the way of allocating color signals to the respective color components is not limited thereto, but arbitrary color signals can be allocated to the respective color components.

Although the video coding device and the video decoding device use two color spaces in the above exemplary embodiments, these devices are also allowed to use three or more color spaces.

Furthermore, each of the exemplary embodiments described above may be realized by hardware, but may also be realized by a computer program.

Figure 10:
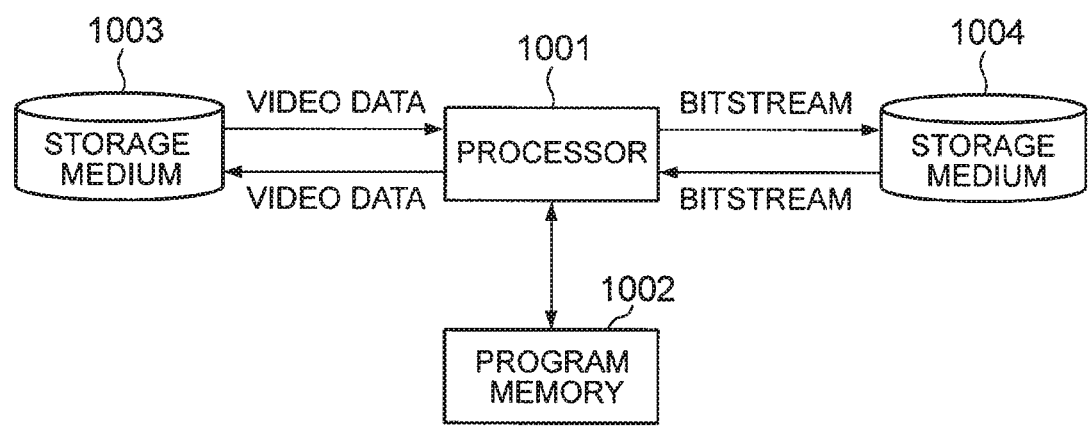
FIG. 10 is a block diagram illustrating a configuration example of an information processing system capable of implementing the functions of the video coding device and the video decoding device.

The information processing system illustrated in FIG. 10 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. A magnetic storage medium such as a hard disk is available as such a storage medium.

In the information processing system illustrated in FIG. 10, the program memory 1002 stores a program for realizing the functions of the blocks (except the block of the buffer) illustrated in each of FIGS. 1 and 3. The processor 1001 realizes the functions of the video coding device or video decoding device illustrated in FIG. 1 or FIG. 3 by executing the processes according to the program stored in the program memory 1002.

Figure 11:
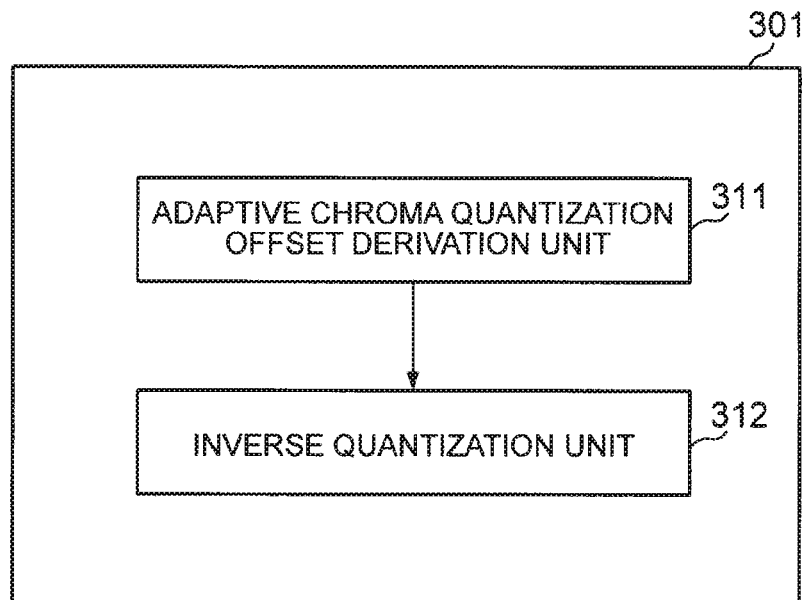
FIG. 11 is a block diagram illustrating the main part of the video coding device.

FIG. 11 is a block diagram illustrating the main part of the video coding device. As illustrated in FIG. 11, the video coding device 301 includes an adaptive chroma quantization offset derivation unit 311 (corresponding to the adaptive chroma quantization offset derivation unit 121 illustrated in FIG. 1, for example) which derives chroma quantization offsets for each color space and an inverse quantization unit 312 (corresponding to the inverse quantizer/inverse frequency transformer 105 illustrated in FIG. 1, for example) which inverse-quantizes a quantization coefficient image by using the chroma quantization offsets for each color space.

Figure 12:
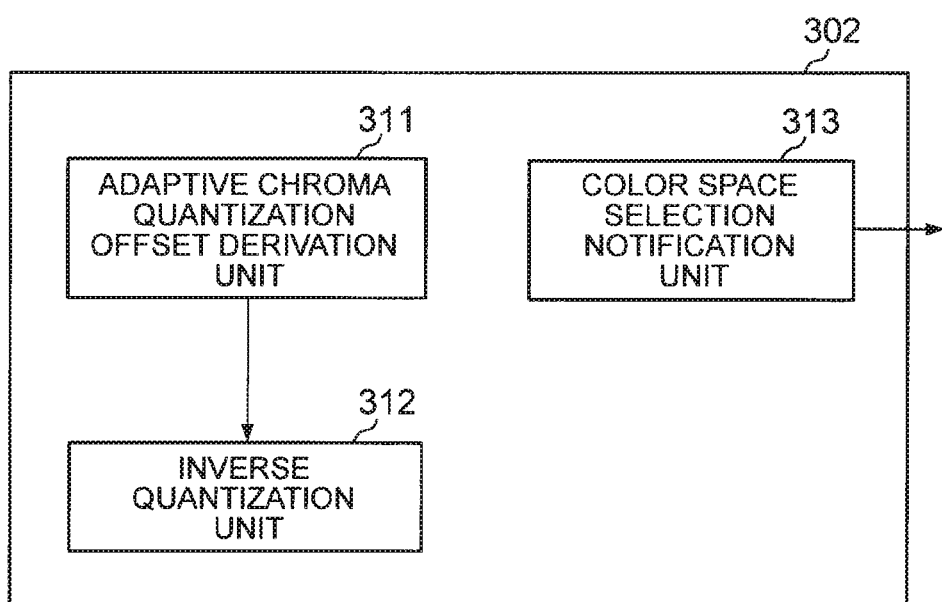
FIG. 12 is a block diagram illustrating another example of the main part of the video coding device.

FIG. 12 is a block diagram illustrating another example of the main part of the video coding device. As illustrated in FIG. 12, the video coding device 302 further includes a color space selection notification unit 313 (corresponding to the entropy encoder 112 illustrated in FIG. 1, for example) which signals that the color space of a prediction error signal is to be selected in block units.

Moreover, unless the video coding device 302 includes a means for signaling information by which the values of the quantization offsets for each color space are able to be identified in the configuration illustrated in FIG. 12, the chroma quantization offsets are implicitly derived in the video coding device 302.

Figure 13:
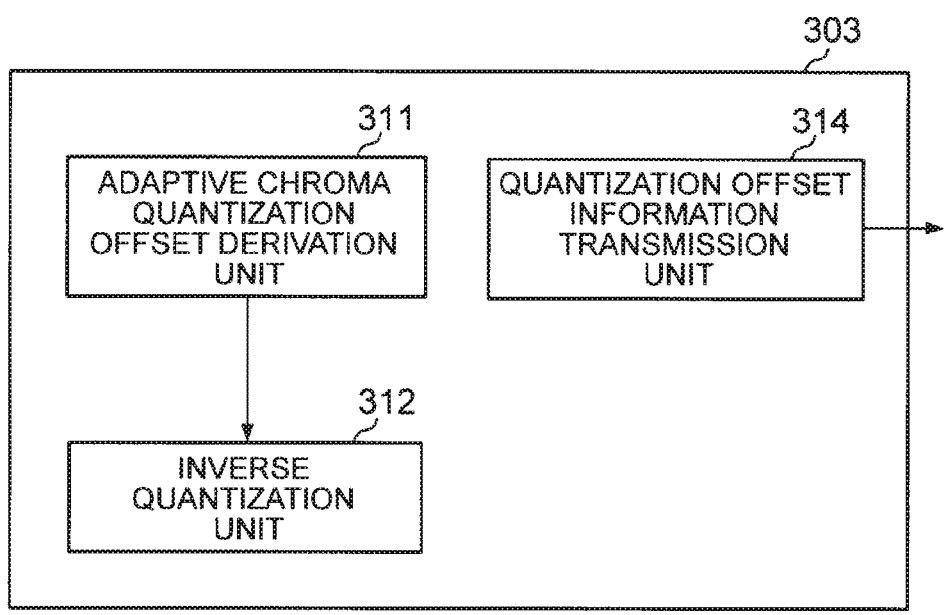
FIG. 13 is a block diagram illustrating still another example of the main part of the video coding device.

FIG. 13 is a block diagram illustrating still another example of the main part of the video coding device. As illustrated in FIG. 13, the video coding device 303 further includes a quantization offset information transmission unit 314 (corresponding to the entropy encoder 112 illustrated in FIG. 1, for example) which signals information by which the values of the chroma quantization offsets for each color space are able to be identified. The information by which the values of chroma quantization offsets are able to be identified is the values themselves of the chroma quantization offsets or an index for specifying the data table in which the chroma quantization offsets retained in the video decoding device are set, for example.

Figure 14:
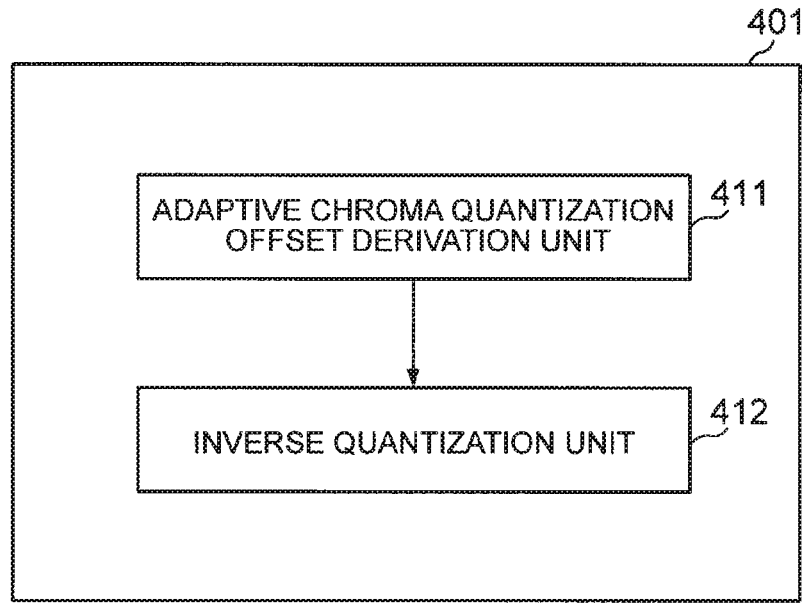
FIG. 14 is a block diagram illustrating the main part of the video decoding device.

FIG. 14 is a block diagram illustrating the main part of the video decoding device. As illustrated in FIG. 14, the video decoding device 401 includes an adaptive chroma quantization offset derivation unit 411 (corresponding to the adaptive chroma quantization offset derivation unit 221 illustrated in FIG. 3, for example) which derives chroma quantization offsets for each color space and an inverse quantization unit 412 (corresponding to the inverse quantizer/inverse frequency transformer 205 illustrated in FIG. 3, for example) which inverse-quantizes a quantization coefficient image by using the chroma quantization offsets for each color space.

Figure 15:
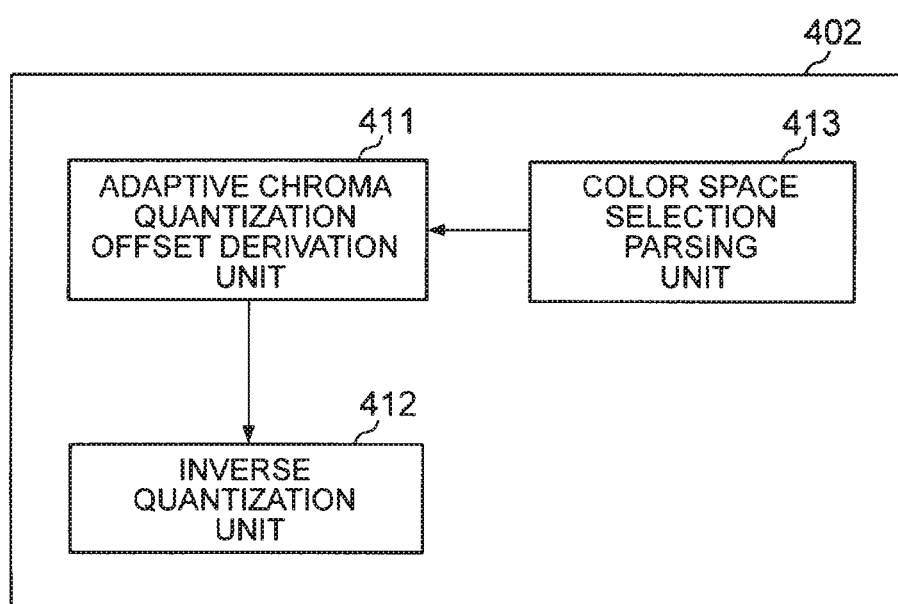
FIG. 15 is a block diagram illustrating another example of the main part of the video decoding device.

FIG. 15 is a block diagram illustrating another example of the main part of the video decoding device. As illustrated in FIG. 15, the video decoding device 402 further includes a color space selection parsing unit 413 (corresponding to the entropy decoder 212 illustrated in FIG. 3, for example) which parses a bitstream to interpret that the color space of a prediction error signal is to be selected in block units.

Moreover, unless the video decoding device 402 includes a means for parsing a bitstream to interpret information by which the values of the chroma quantization offsets for each color space are able to be identified in the configuration illustrated in FIG. 15, the video decoding device 402 implicitly derives the chroma quantization offset.

Figure 16:
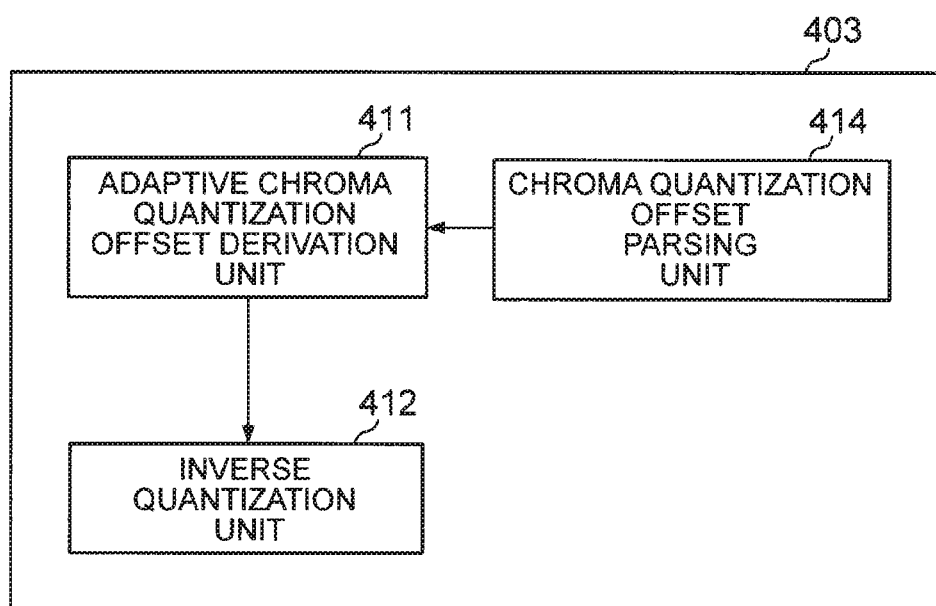
FIG. 16 is a block diagram illustrating still another example of the main part of the video decoding device.
Figure 17:
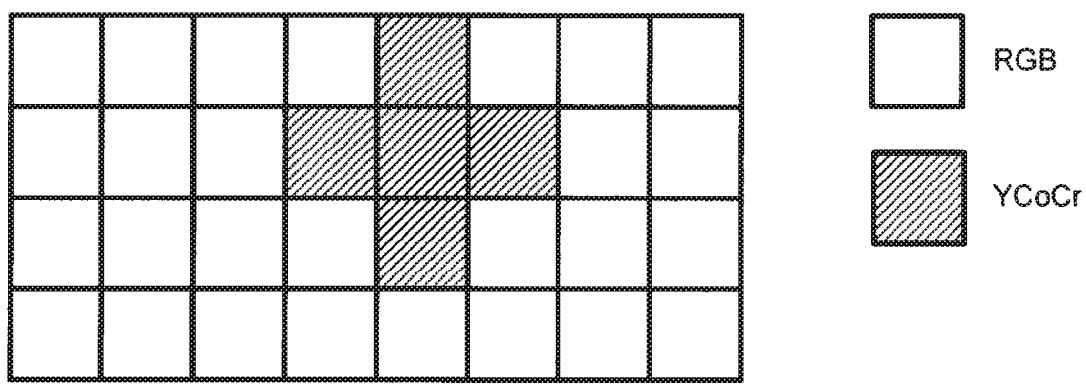
FIG. 17 is an explanatory diagram illustrating an example of an adaptive color transform in residual domain.

FIG. 16 is a block diagram illustrating still another example of the main part of the video decoding device. As illustrated in FIG. 16, the video decoding device 403 further includes a chroma quantization offset parsing unit 414 (corresponding to the entropy decoder 212 illustrated in FIG. 3, for example) which identifies the values of the chroma quantization offsets for each color space on the basis of the information interpreted from the received bitstream.

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

This application claims priority to Japanese Patent Application No. 2014-204392 filed on Oct. 3, 2014, and the entire disclosure thereof is hereby incorporated herein by reference.

REFERENCE SIGNS LIST

101 Switch
102 Color space transformer
103 Switch
104 Frequency transformer/quantizer
105 Inverse quantizer/inverse frequency transformer
106 Switch
107 Inverse color space transformer
108 Switch
109 Buffer
110 Predictor
111 Prediction parameter determiner
112 Entropy encoder
115 Subtractor
116 Adder
121 Adaptive chroma quantization offset derivation unit
122 Switch
205 Inverse quantizer/inverse frequency transformer
206 Switch
207 Inverse color space transformer
208 Switch
209 Buffer
210 Predictor
212 Entropy decoder
216 Adder
221 Adaptive chroma quantization offset derivation unit
222 Switch
301, 302, 303 Video coding device
311 Adaptive chroma quantization offset derivation unit
312 Inverse quantization unit
313 Color space selection notification unit
314 Quantization offset information transmission unit
401, 402, 403 Video decoding device
411 Adaptive chroma quantization offset derivation unit
412 Inverse quantization unit
413 Color space selection parsing unit
414 Chrominance quantization offset parsing unit
1001 Processor
1002 Program memory
1003 Storage medium
1004 Storage medium

The invention claimed is:

1. A video coding device capable of selecting, from among a plurality of color spaces, a color space of a prediction error signal in coded block units, the device comprising:
a hardware including at least a processor,
wherein the hardware implements:
a generation unit which generates the prediction error signal from an input image;
a transformation unit which transforms the prediction error signal depending on a color space selected from among the plurality of color spaces;
an adaptive chroma quantization offset derivation unit which derives an adaptive chroma quantization offset, in coded block units, by using a clipping function which clips a value obtained using a quantization parameter of a first color component of a color space selected from the plurality of color spaces and a chroma quantization offset for each block of a color component other than the first color component into a predetermined range;
a quantization unit which generates a quantization coefficient image based on the prediction error signal or the transformed prediction error signal by the transformation unit; and
an inverse quantization unit which inverse-quantizes the quantization coefficient image by using the derived chroma quantization offset for the selected color space.

2. The video coding device according to claim 1, wherein the hardware further implements a color space selection notification unit which signals that the color space of the prediction error signal is to be selected in block units.

3. The video coding device according to claim 2, wherein the hardware further implements a chroma quantization offset information transmission unit which signals information by which the value of the chroma quantization offset for each color space is able to be identified.

4. A video decoding device capable of selecting, from among a plurality of color spaces, a color space of a prediction error signal in coded block units, the device comprising:
  a hardware including at least a processor,
  wherein the hardware implements:
    an entropy decoding unit which parses a bitstream to get information indicating a color space selected from among the plurality of color spaces;
    an adaptive chroma quantization offset derivation unit which derives an adaptive chroma quantization offset, in coded block units, by using a clipping function which clips a value obtained using a quantization parameter of a first color component of a color space selected from the plurality of color spaces and a chroma quantization offset for each block of a color component other than the first color component into a predetermined range; and
    an inverse quantization unit which inverse-quantizes a quantization coefficient image by using a quantization offset adjusted based on the derived chroma quantization offset for the selected color space.

5. The video decoding device according to claim 4, wherein the hardware further implements a color space selection parsing unit which parses a received bitstream to interpret that the color space of the prediction error signal is to be selected in block units.

6. The video decoding device according to claim 5, wherein the hardware further implements a chroma quantization offset parsing unit which parses the value of the quantization offset for each color space based on information obtained from the received bitstream.

7. A video coding method, implemented by a processor, capable of selecting, from among a plurality of color spaces, a color space of a prediction error signal in coded block units, the method comprising:
  generating the prediction error signal from an input image;
  transforming the prediction error signal depending on a color space selected from among the plurality of color spaces;
  deriving an adaptive chroma quantization offset, in coded block units, by using a clipping function which clips a value obtained using a quantization parameter of a first color component of a color space selected from the plurality of color spaces and a chroma quantization offset for each block of a color component other than the first color component into a predetermined range;
  generating a quantization coefficient image based on the prediction error signal or the transformed prediction error signal; and
  inverse-quantizing the quantization coefficient image by using the derived chroma quantization offset for the selected color space.

8. A video decoding method, implemented by a processor, capable of selecting, from among a plurality of color spaces, a color space of a prediction error signal in coded block units, the method comprising:
  parsing a bitstream to get information indicating a color space selected from among the plurality of color spaces;
  deriving an adaptive chroma quantization offset, in coded block units, by using a clipping function which clips a value obtained using a quantization parameter of a first color component of a color space selected from the plurality of color spaces and a chroma quantization offset for each block of a color component other than the first color component into a predetermined range; and
  inverse-quantizing a quantization coefficient image by using a quantization offset adjusted based on the derived chroma quantization offset for the selected color space.

9. A non-transitory computer readable recording media storing a video coding program for performing a video coding method capable of selecting, from among a plurality of color spaces, a color space of a prediction error signal in coded block units, the program causing a computer to perform:
  a process of generating the prediction error signal from an input image;
  a process of transforming the prediction error signal depending on a color space selected from among the plurality of color spaces;
  a process of deriving an adaptive chroma quantization offset, in coded block units, by using a clipping function which clips a value obtained using a quantization parameter of a first color component of a color space selected from the plurality of color spaces and a chroma quantization offset for each block of a color component other than the first color component into a predetermined range;
  a process of generating a quantization coefficient image based on the prediction error signal or the transformed prediction error signal; and
  a process of inverse-quantizing the quantization coefficient image by using the derived chroma quantization offset for the selected color space.

10. A non-transitory computer readable recording media storing video decoding program for performing a video decoding method capable of selecting, from among a plurality of color spaces, a color space of a prediction error signal in coded block units, the program causing a computer to perform:
  a process of parsing a bitstream to get information indicating a color space selected from among the plurality of color spaces;
  a process of deriving an adaptive chroma quantization offset, in coded block units, by using a clipping function which clips a value obtained using a quantization parameter of a first color component of a color space selected from the plurality of color spaces and a chroma quantization offset for each block of a color component other than the first color component into a predetermined range; and
  a process of inverse-quantizing a quantization coefficient image by using a quantization offset adjusted based on the derived chroma quantization offset for the selected color space.

* * * * *